CENTRAL TO REMOTE SIGNALLING SYSTEM HAVING SYNCHRONIZED COUNTERS
Filed Aug. 30, 1963
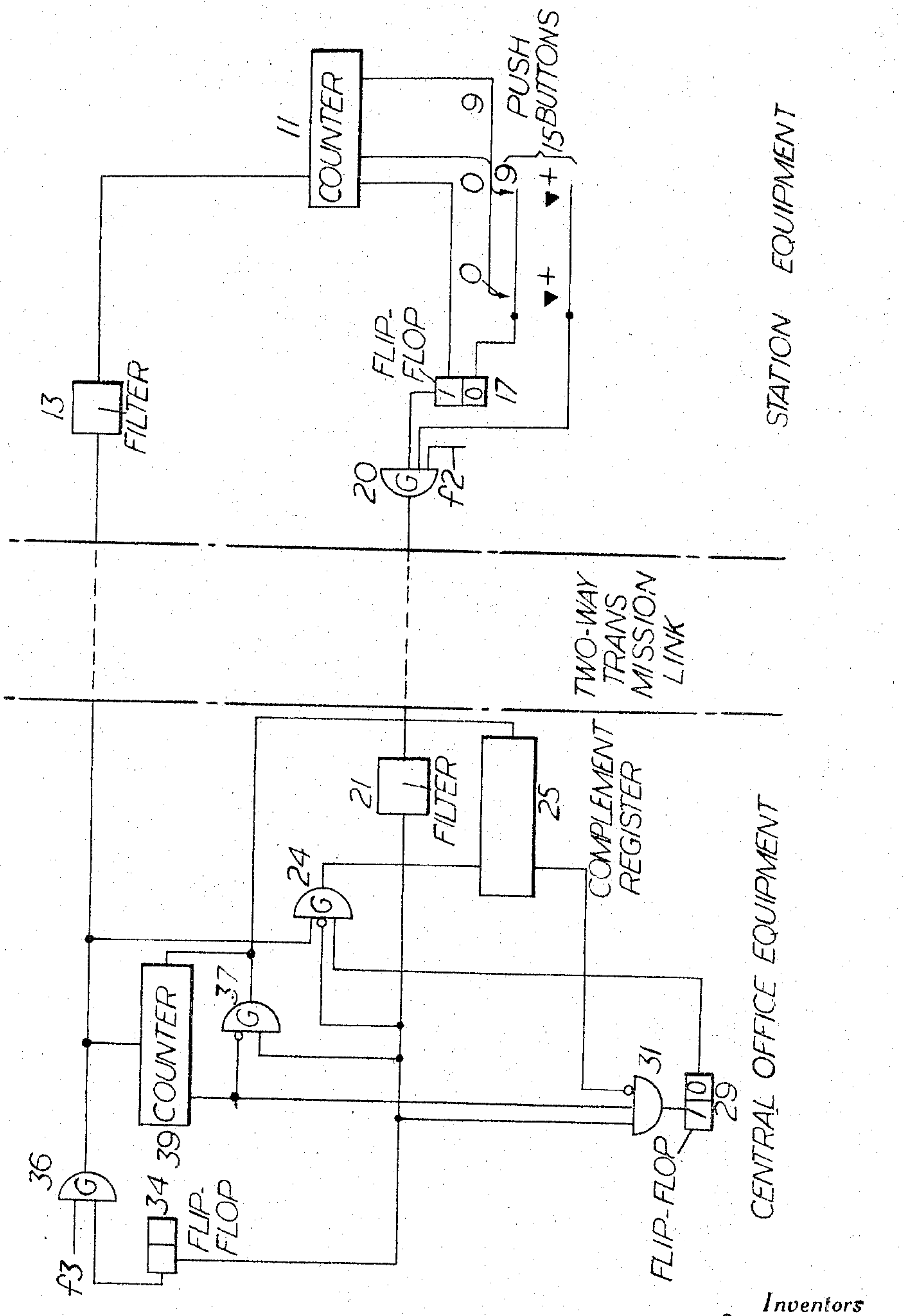
Inventors
O. E. EKBERGH
P. G. JONSSON
W. F. FETZ
By Phillip A. Weiss
Attorney United States Patent Office 3,312,940

Patented Apr. 4, 1967

3,312,940

CENTRAL TO REMOTE SIGNALLING SYSTEM HAVING SYNCHRONIZED COUNTERS

Oskar Evert Ekbergh, Hagersten, Per Gustaf Jonsson, Sorlid Ronninge, and Walter Franz Fetz, Sodertalje, Sweden, assignors to International Standard Electric Corporation, New York, N.Y., a corporation of Delaware Filed Aug. 30, 1963, Ser. No. 305,800
Claims priority, application Sweden, Sept. 10, 1962, 9,731/62
5 Claims. (Cl. 340—163)

The present invention relates in general to signalling systems for transmitting digital two-way information over communication links between central office equipment and stationary or mobile stations and in particular to the transmission of digital information from mobile telephone subsets to exchange equipment.

Prior art arrangements are known which effect the transmission of digital information by causing the mobile telephone subsets to emit a certain carrier frequency with each digit being represented by a given change of the carrier frequency, the change being caused by the depression of a button corresponding to the digit to be transmitted.

These prior art systems require frequency-selective receivers in the exchange station having a relatively high selectivity since the digit representing frequencies are related relatively closely with respect to each other. In consequence thereof, the receivers of the exchange equipment and the frequency transmitter of the mobile subsets are relatively critical and complicated. Therefore, it is an object of this invention to provide a simple and reliable signalling system for use in mobile radio systems.

While a conversational condition of the circuit arrangement according to the invention is indicated by a continuous transmission of tone-frequency currents in one or both traffic directions over the communication medium, the present invention is characterized by the steps of initiating transmission of signal information, both numerical and nonnumerical, from the mobile subsets or exchange station by the depression of a signal pushbutton representative of the desired signal information, of causing the mobile subset to apply a start frequency to pulse means located in the exchange station; operating the pulse means to emit a periodical signal for stepping period counting means in the exchange station and also stepping corresponding counting means in the mobile subset equipment; interrupting the application of the start frequency when the period counting means in the mobile subset equipment have been stepped to the position corresponding to the desired signal information; and registering in the exchange station information which corresponds to the desired signal information responsive to the interruption of the application of the start frequency.

These objects and features of the invention will become apparent and the invention will be best understood by reference to the following description taken in conjunction with the accompanying single drawing, which in the left-hand portion shows exchange equipment and in the right-hand portion shows mobile station equipment.

For the purpose of transmitting digital information from the mobile subset to the exchange equipment, the particular pushbutton of a set of pushbuttons 15, corresponding to the desired digit will be depressed, whereby the gate 20 is opened and the signal frequency $f_2$ is being transmitted to the exchange equipment over the two way transmission link. The signal frequency $f_2$ is received through filter 21 and causes the bistable flip-flop circuit 34 to switch to position 1. With flip-flop circuit 34 in position 1, gate 36 is opened and the signal frequency $f_3$ is transmitted to the mobile subset equipment.

The signal frequency $f_3$ is a low-frequency as compared with the signal frequency $f_2$ and operates the counter 39 of the exchange equipment directly and also operates a similar counter 11 of the mobile subset through the filter 13. Counter 11 advances one step in response to each period of the signal frequency $f_3$. When counter 11 has advanced to the position corresponding to the digit representing the depressed pushbutton, the bistable flip-flop 17 is switched to its position 1 and closes gate 20 which terminates the transmission of frequency $f_2$. The cessation of the transmission of frequency $f_2$ in the exchange station results in the opening of gate 24 which causes register 25 to step in parallel with counters 39 and 11 while these latter counters are homing.

After counter 11 has completed a cycle of operation and returned to its home position, the flip-flop circuit 17 is again switched in its zero position 0 and the gate 20 is again opened, so that the signal frequency $f_2$ is transmitted to the exchange equipment. Now, if the counter 11 has received the same number of signals as counter 39, counter 39 would also have completed one operational cycle and thus occupy its home or zero position. At this time, counter 25 is off its home position, in which case gate 31 is opened in response to the signal frequency $f_2$ with the result that flip-flop circuit 29 will switch to position 1 and the stepping of the register 25 will be stopped.

In the event counter 39 does not occupy its home position when the signal frequency $f_2$ again occurs at the exchange equipment, this will be indicative of the fact that the counters 39 and 11 have not been stepped in synchronism with one another. In this case, the exchange equipment will be restored to its normal or zero state in response to the receipt of signal frequency $f_2$ through the filter 21 and the gate 37, the said synchronism thereby re-established and the switching operations repeated until the counter 39 again has been restored to its home position in time coincidence with the counter 11.

At the instant that bistable flip-flop circuit 29 switched to its position 1, the complement of the desired digit will have been registered in the counter 25. This desired digit may now be reproduced and set to another exchange station by causing a multi-vibrator to close and open a subscriber's line loop and at the same time to advance the counter 25 to its home position. When the digit has been transmitted to another station, a receipt acknowledgement is sent to the mobile subset equipment causing the pushbutton set previously depressed to be released at the same time the digit complement register 25 is restored to the home position.

Even if the invention has been described in the foregoing with reference to a specific embodiment thereof, it should be clearly understood that this description is made only by way of an example. Hence, the embodiment exemplified may be modified in a suitable manner without departing from the scope of the invention.

We claim:

1. A signaling system for transmitting digital information over a transmission link interconnecting central office equipment with remotely located station equipment comprising digit indicating means in the station equipment for indicating the value of any desired digit to be transmitted, means responsive to the operation of said digit indicating means for transmitting a first frequency over said link, means in the said central office equipment responsive to the receipt of said first frequency for generating a second frequency, counting means in the said central office equipment and said station equipment for counting the number of each cycle of said second frequency means in the station equipment responsive to the number of cycles of said second frequency counted by said counting means therein corresponding to the said indicated digit value for terminating the transmission of said first frequency, and recording means in the said central office equipment operable responsive to said termination of transmission of said first frequency for rendering the value of the digit indicated in said station equipment.

2. A signalling system as set forth in claim 1 wherein said recording means records the difference between a given number and the said counted number of cycles of said second frequency.

3. A signalling system as set forth in claim 1 wherein each said counting means comprises a ring-type counter having a predetermined number of positions at least equal to the greatest value of any digit and wherein the said recording means records the number of unoperated positions of said ring-type counter responsive to the termination of transmission of said first frequency.

4. A signalling system as set forth in claim 1, wherein each said counting means comprises a ring-type counter and associated means for advancing each said counting means to its first position responsive to the termination of transmission of said first frequency and wherein means is provided in said station equipment for checking the correct recording of said digit value by retransmitting said first frequency to operate both said counting means in synchronism.

5. In a signalling system as set forth in claim 4, means responsive to the failure of both said counting means to operate in synchronism for restoring both said counting means to their first position.

No references cited.

NEIL C. READ, *Primary Examiner.*

H. I. PITTS, *Assistant Examiner.*